(12) United States Patent  (10) Patent No.: US 8,819,444 B2
Shahbazi et al.  (45) Date of Patent: Aug. 26, 2014

(54) METHODS FOR SINGLE SIGNON (SSO) USING DECENTRALIZED PASSWORD AND CREDENTIAL MANAGEMENT

(76) Inventors: Majid Shahbazi, Oakton, VA (US); Mahmood Shahbazi, Oakton, VA (US)

( * ) Notice: Subject to any disclaimer, the term of this patent is extended or adjusted under 35 U.S.C. 154(b) by 212 days.

(21) Appl. No.: 13/338,156

(22) Filed: Dec. 27, 2011

(65) Prior Publication Data

US 2013/0166918 A1 Jun. 27, 2013

(51) Int. Cl.
*G06F 21/00* (2013.01)
(52) U.S. Cl.
USPC ............................................. 713/183
(58) Field of Classification Search
CPC ........ G06F 21/31; G06F 21/36; H04L 63/083
USPC .......................................... 713/183
See application file for complete search history.

(56) References Cited

U.S. PATENT DOCUMENTS

| | | | |
|---|---|---|---|
| 5,875,296 A * | 2/1999 | Shi et al. ........................ 726/5 |
| 6,243,816 B1 | 6/2001 | Fang et al. |
| 6,263,446 B1 * | 7/2001 | Kausik et al. ..................... 726/5 |
| 7,360,096 B2 * | 4/2008 | Bracewell et al. ............ 713/183 |
| 7,496,954 B1 | 2/2009 | Himawan et al. |
| 7,690,026 B2 | 3/2010 | Zhu et al. |
| 7,757,080 B1 * | 7/2010 | Schilder ........................ 713/162 |
| 8,024,781 B2 * | 9/2011 | Saunders et al. ................. 726/5 |
| 2003/0012382 A1 | 1/2003 | Ferchichi et al. |
| 2003/0164400 A1 * | 9/2003 | Boyd ............................ 235/382 |
| 2003/0182551 A1 | 9/2003 | Frantz et al. |
| 2003/0195858 A1 * | 10/2003 | Watanabe et al. ................ 705/75 |
| 2004/0098609 A1 * | 5/2004 | Bracewell et al. ............ 713/200 |
| 2007/0033393 A1 * | 2/2007 | Ganesan et al. .............. 713/155 |
| 2008/0276308 A1 | 11/2008 | Graser et al. |
| 2009/0055642 A1 * | 2/2009 | Myers et al. ................... 713/155 |
| 2009/0172795 A1 | 7/2009 | Ritari et al. |
| 2009/0249439 A1 | 10/2009 | Olden et al. |
| 2009/0328171 A1 | 12/2009 | Bayus et al. |
| 2010/0070759 A1 | 3/2010 | Leon Cobos et al. |
| 2010/0242101 A1 * | 9/2010 | Reese, Jr. .......................... 726/6 |
| 2010/0306547 A1 * | 12/2010 | Fallows et al. ................ 713/178 |
| 2011/0219427 A1 | 9/2011 | Hito et al. |
| 2011/0277027 A1 | 11/2011 | Hayton et al. |
| 2013/0037429 A1 * | 2/2013 | Sarnoff et al. ................ 206/232 |

* cited by examiner

*Primary Examiner* — Teshome Hailu
(74) *Attorney, Agent, or Firm* — Shawna J. Shaw

(57) ABSTRACT

A method for single sign-on (SSO) that provides decentralized credential management using end-to-end security. Credential (and other personal user information) management is decentralized in that encryption is performed locally on the user's computer. The user's encrypted credentials may be stored by the login server and/or a plurality of distributed servers/databases (such as a cloud). The login server never has access to the user's credentials or other personal information. When the user wants to use single sign-on, he enters his password into his browser and the browser submits the encrypted/hashed password to the login server for validation. Upon validation, the browser receives the user's encrypted credentials. The credentials are decrypted by the browser and provided to relevant websites to automatically log the user in.

19 Claims, 13 Drawing Sheets

400

Registration Process

Login Process

METHODS FOR SINGLE SIGNON (SSO) USING DECENTRALIZED PASSWORD AND CREDENTIAL MANAGEMENT

FIELD OF THE INVENTION

The present disclosure relates generally to secure digital communication, and more particularly to decentralized credential management.

BACKGROUND OF THE INVENTION

Today, users are conducting online transactions at an ever increasing rate. In light of this phenomenon, it is not uncommon for a user to have anywhere from twenty to eighty, or more, separate online accounts. Examples of such accounts may include, email, news, social networking sites, online banking, music, movies, games, online auctions, shopping, and more. Typically, a user must possess a separate ID and password to access each of these accounts.

One ongoing dilemma concerning passwords, is that as computer processing capabilities increase, passwords must become longer and more complex to be considered "secure." The problem is that, it is difficult for users to remember more than just a handful of different passwords at a time. As a result, users often "recycle" their passwords (often containing names of relatives or pets, birthdates, etc.—making them even less secure. If a password is too complex, users will often write it down next to their computers to serve as reminders. However anyone walking by could easily obtain the password and use it to gain unauthorized access to the user's system. If one password is obtained or intercepted, it is likely that it can also be successfully used to gain access to several of the user's other accounts (if a similar password is used). Even if a user manages to remember their passwords and to keep them physically secure, it is still possible to easily intercept and read passwords when sent in the clear over a non-secure network. For example, many users' are unaware of implications of sending clear-text passwords over open wifi networks—despite their growing popularity.

Another problem of an even larger scope is that of "centralized" password storage and encryption. In most cases, a central database will encrypt passwords once received using the same key. If the system is successfully hacked, hundreds—if not thousands—of user accounts with sensitive information such as SSNs, credit card numbers, etc. can be compromised. Such authorities therefore spend inordinate amounts to ensure their central databases are secure and to maintain their reputations.

There remains a need to securely manage multiple user passwords without increasing complexity for the user. There is also a need to bring "best practices" for information security used by large organizations to the user level. In addition, a need exists to facilitate user control over credentials and other personal information.

SUMMARY OF THE INVENTION

The above needs can also be addressed using single user sign-on that performs local encryption and decryption of user credentials using a "multi-layered" security approach and provides decentralized credential management. Such decentralized password management only requires a user to log in once, enables easy access and management of user accounts, saves time, is convenient, and highly secure.

Disclosed are various methods for decentralized password and credential management. In general, a user creates an account and enters a username/password onto a central login website. The password is immediately hashed and further used to encrypt a one-time random number generated for the user by the central login server. The encrypted random number is then used by the browser to encrypt the user's personal data and/or credentials. Credential management is thus decentralized in that encryption and decryption of the user's personal information happens on the user's system. The central login server is used for storage of credentials. The storage can be in a public cloud, private cloud, user local or remote storage, and mobile storage devices (e.g., USB or mobile device).

The present disclosure improves data security in one regard by employing 'best practices' used by large organizations. Best practices employed by the present disclosure include, but are not limited to: encryption recommendations and standards as set forth in Federal Information Processing Standards (FIPS): 180-1, 180-2, 140, and 197 as incorporated herein by reference; secure hash algorithm: SHA-1, SHA-2, SHA-512, HMAC, AES-128 and AES-256 as incorporated herein by reference; SSL/TLS, strong cryptographic random generators; one time passwords; timestamps; etc. Data security is also improved by providing multiple security layers and one-way encryption algorithms.

To add yet another layer of security, encrypted user data or credentials may be distributed and stored in one or more locations. For example, the encrypted data may be stored on one or more servers or databases. Such data may also be distributed and stored using any type of public or private cloud hosting platform or service—saving cost, providing reliability, and improving security. Security is improved because instead of being allowed to access several user's information in one location, the data is dispersed. As a result, a potential hacker must first know where to go to gather all the data. Secondly, to obtain hundreds of passwords, a hacker must access each user device and figure out a different key for each user.

During initial registration with the login server, the user downloads instructions to their browser and goes to the login server website. The user enters a username and password in their browser. Additionally, the user may also provide an answer to a security question to serve as a back-up in the event the password is forgotten. The password (and security question answer) is immediately hashed and salted by the browser and sent to the login server over a secure channel. The login server, in turn, generates a one-time random number for each user. This one-time random number is encrypted with the user's password hash (and security question answer) and provided to the browser in an encrypted form. Instructions on the browser further encrypt the user's other information and credentials using the password-encrypted one-time random number. The user's encrypted other information is sent to the login server to be stored by one or more servers and/or databases. The next time a user logs in to the login server, the hashed password is validated by the login server. Upon validation, the user receives his encrypted credentials and other information. The credentials are decrypted with the password on the browser to reveal the one-time random number, and the one-time random number is then used to decrypt the credentials.

Advantageously, a multilayered security approach is used where a one-time random number is generated, encrypted with the user's hashed password on one device, and the user's credentials encrypted with the encrypted one-time random number on another device. In addition, communication between the user's browser and the login server takes place over one or more secure channels (SSL/TLS, IPsec, VPNs, etc.). Various protocols used in the single sign-on and encryption process include, but are not limited to: OpenID, SAML, AES-128, AES 256, SHA-1, SHA-2, SHA-512, HMAC, or the like. In addition, a combination of standard or non-standard authentication protocols may also be used. The other user information may include: URI information and associated credentials, personal documents, and more. It is appreciated that the encrypted other user information may be stored by one or more servers and/or databases until needed by the user. In this way, the user can have access to his personal information, credentials, documents, etc. virtually anywhere. The next time a user enters his password into the browser and is validated by the login server, relevant encrypted data is conveniently provided to the user's system. The browser instructions use the entered password to decrypt the credentials or other data and obtain the one-time random number (also known as key encryption key). In turn, the one-time random number is used to decrypt the actual data. The user's credentials are automatically provided to websites the user desires to access by the browser. It is appreciated that once the user enters his single password and is validated/logged in, the process disclosed herein appears "seamless" to the user and only takes a number of seconds.

Among its several aspects, the present disclosure accordingly recognizes a need for providing decentralized password and credential management with minimal burden to the user. It is recognized that the user may be logged in different ways (according to convenience, preference, cost, capabilities, etc.) and therefore should not be considered to be limited by the described implementations. In some examples, the user may be logged in by going to a website first and being connected to the login server, by first going to a login website or portal, or by being "automatically" logged in e.g., via a digital certificate. According to one preferred embodiment, the login website presents the user with multiple icons representing websites the user may automatically log on to by simply "clicking" the icon. Such websites may be previously registered with the login server and/or user device. When the user clicks on one of the icons, instructions on the browser obtain the user's encrypted credentials associated with that site. The instructions decrypt the user's credentials and automatically provide them to the site.

According to another aspect of the disclosure, a method for decentralized single sign-on to a plurality of websites via instructions executed by a user computer browser is disclosed. Initial registration steps performed by the browser include: establishing a secure session with a login server; receiving a username, password and security question answer; hashing and salting the user's password and security question answer; receiving a one-time random number generated by the login server and encrypted with the hashed password/security question answer; encrypting the user's credentials and other data with the encrypted one-time random number; and submitting the encrypted credentials and other data to the login server to be stored. In embodiments, the encrypted credential and other user data may be stored by one or more servers and/or databases—including a cloud hosting platform. Post registration steps performed by the browser include: receiving the user's password; hashing and salting the password; submitting the hashed password to the login server for validation; receiving the user's encrypted credentials and other data; using the password to decrypt and reveal the one-time random number; and using the one-time random number to decrypt the user's credentials and other data. In the event that a user forgets his password, he may enter the security question answer which may also be used to decrypt the one-time random number. When the user desires to access a website, the browser automatically provides the corresponding credentials to the website allowing the user to be logged in.

In certain embodiments, a user browser may be provided with an optical code for single sign-on. The optical code may be a two dimensional code (QR code, bar code), a picture, image, etc. The optical code is used to validate the user and/or provide additional login information.

Advantages of optical codes are that they can carry large amounts of information and optionally do not require the user to use a keyboard or keypad. In embodiments, the user may be provided with a digital certificate embedded in a quick response (QR) code. This will make managing passwords user-friendly and secure.

Accordingly, the present disclosure offers many attractive solutions to problems associated with centralized storage of passwords, phishing, having to remember different passwords for increasing numbers of online accounts, insecure password practices, and more. In addition, security is improved because user credentials and data are encrypted locally at the user's site with something that only the user knows. The encrypted user credentials and data are further sent over secure channels—affording "end-to-end" security. Moreover, the encrypted data may be stored in a "distributed" fashion using cloud resources. As a result, the barriers for hackers and malicious users to access large amounts of data are substantially increased. Even more, by using secure push/pull technology, a user is provided more control over, and 'just-in-time' access to, his credentials and personal information.

BRIEF DESCRIPTION OF THE DRAWINGS

Non-limiting and non-exhaustive embodiments are described with reference to the following figures, wherein like reference numerals refer to like parts throughout the various views unless otherwise specified.

FIG. 2b-c illustrate a more detailed implementation where a user goes to a login server website for single sign-on.

FIG. 3b-c illustrate a more detailed implementation where a user goes to a website first for single sign-on.

DETAILED DESCRIPTION OF THE INVENTION AND PREFERRED EMBODIMENTS

Reference will now be made in detail to various exemplary embodiments of the invention, examples of which are illustrated in the accompanying drawings. The following detailed description describes certain embodiments of the invention, and should not be considered as limiting the invention to those embodiments. In addition, it is understood that "a" refers to one, or more; and that the terms "user device" and "user computer" are referenced interchangeably. It is further appreciated that "user computer" or "user device" also encompasses background processes, webservices, etc. that can perform single sign-on and is therefore not limited to single sign-on for individuals.

Figure 1:
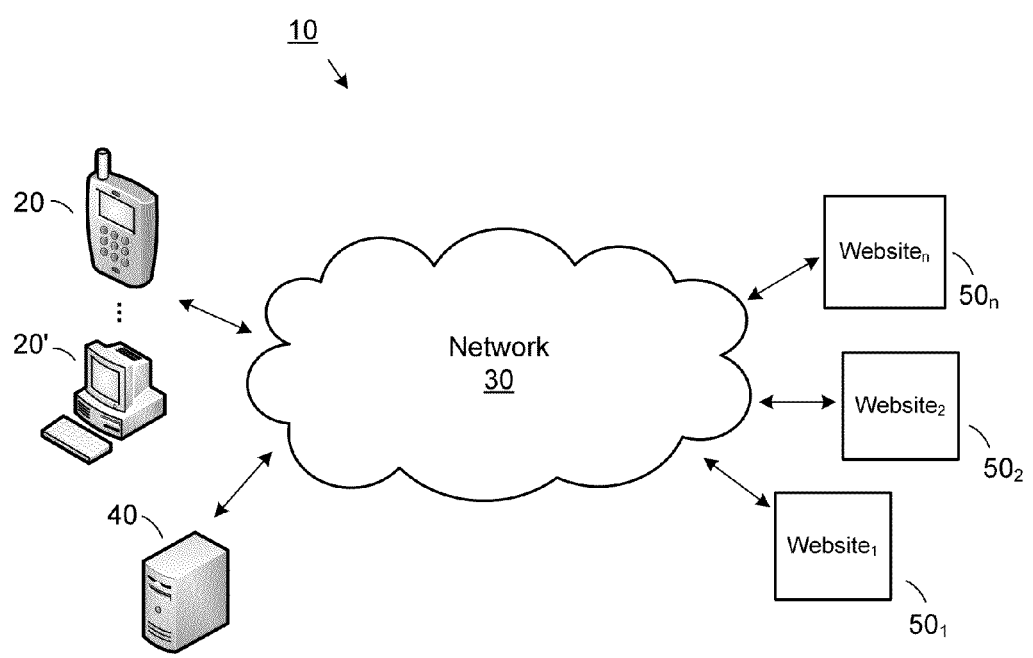
FIG. 1 illustrates a basic exemplary network environment that includes a user computer, login server, and a plurality of distributed websites and corresponding servers.

Turning now to the figures, which depict various exemplary embodiments of the invention, FIG. 1 shows a block diagram of an exemplary system in which the present disclosure may be practiced (as designated by reference numeral 10). As illustrated, the system comprises a user computer 20 communatively coupled to a plurality of remote servers/websites 40, 50 via network 30. It is appreciated that the user computer 20 may comprise a desktop, PC, laptop, PDA, mobile phone, iPod, iPad, workstation, server, or any other processor-driven or computer device. Although depicted as one element in the figure, it is appreciated that user computer 20 represents multiple user computers (i.e., associated with an endless number of users). User computer 20 is addressed in more detail with respect to FIG. 7.

Network 30 may comprise any combination of LANs, WANs, MANs, the Internet, Intranets, private networks, wired and/or wireless (e.g., IEEE 802.11 standard, satellite, cellular, GSM/GPRS, 3G, 4G, CDMA, TDMA) networks, mobile networks, public switched telephone networks (PSTN), SMS, SMSC, MMS, SMTP/MIME and/or IM distribution networks, or any other suitable network arrangements. Communication links (depicted by double arrows) may include transmission links such as wired, wireless, fiber-optic, mobile, and the like. It is further appreciated that Network 30 may also encompass one or more public or private cloud hosting platform or service for data processing and/or storage or other functions.

The login server 40 includes a plurality of processor modules for validating users/devices and managing user accounts. However, it is important to point out that the login server 40 never has access to any of the users unencrypted credentials or personal identifiable information. It is appreciated that login server 40 may comprise more than one physical or virtual servers in one or more locations. Login server 40 is discussed in more detail with respect to FIG. 9.

Also shown in FIG. 1, are a plurality of distributed websites $50_{1-n}$. These websites reside on one or more corresponding servers in various network locations. For purposes of this example, websites $50_{1-n}$ require a user to have associated credentials (username, password, PIN, digital certificate, etc.) in order to log in. Such websites may limit access to authorized users such as businesses or organizations and/or include services as online banking, social networking, entertainment, etc.—all of which require certain levels of security.

Figure 2A:
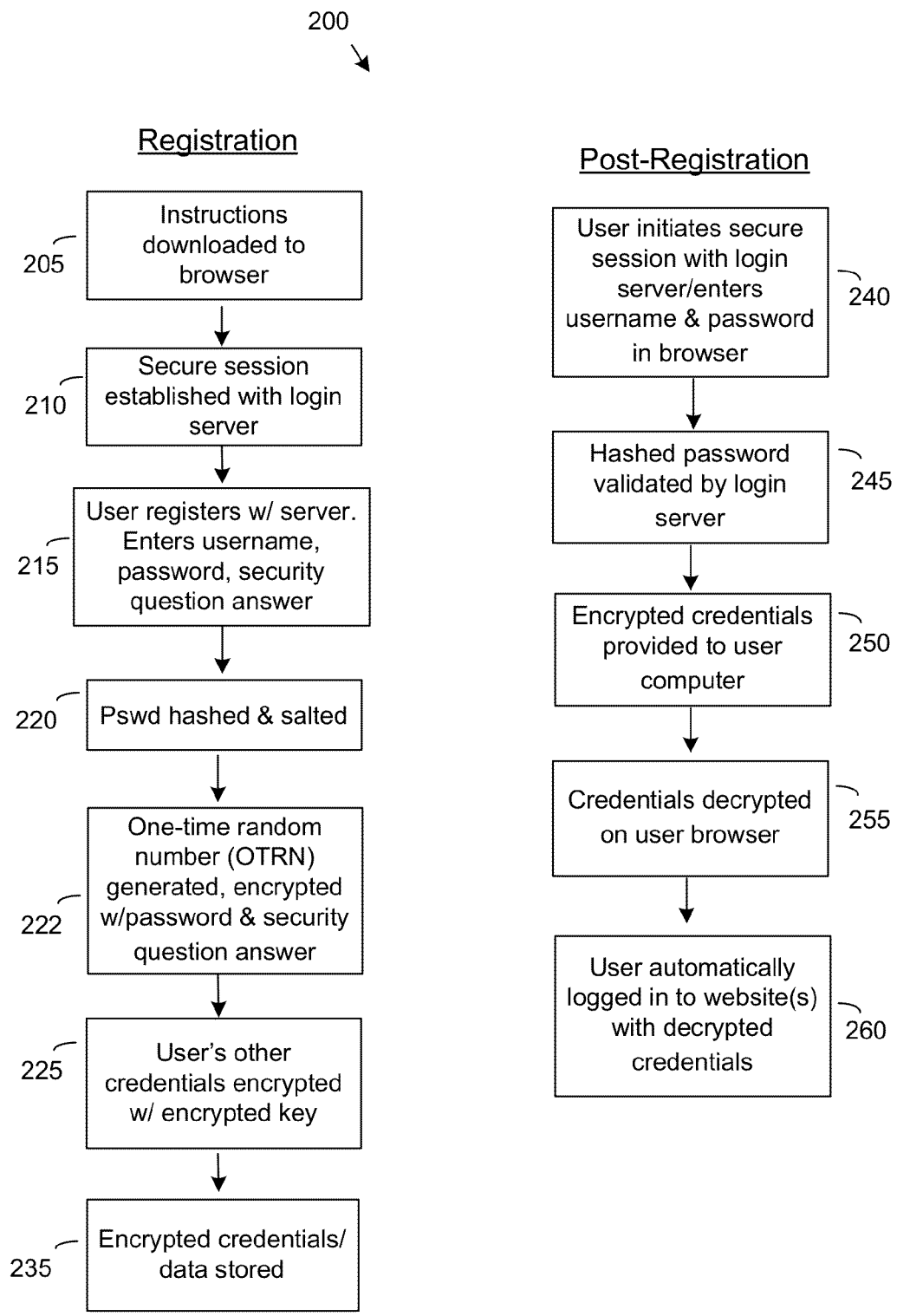
FIG. 2a illustrates an implementation where a user goes to a login server portal to enable single sign-on for multiple websites.

FIG. 2a shows a basic implementation (generally depicted as 200) where a user registers with login server 40 to enable subsequent single sign-on for multiple websites $50_{1-n}$. Steps 205-235 represent initial registration steps with the login server 40. According to step 205, instructions are downloaded to the user computer browser. Such instructions may be downloaded directly from the login server 40, or from another source. For example, a user can go to the login website and the download software instructions, or the user can obtain the software from other download sites. The instructions may take the form of an App, plug-in, add-on, or the like, and enable the user computer browser to perform the disclosed method steps. In step 210, the browser establishes a secure communication session with the login server 40. Examples of secure sessions include, but are not limited to, SSL/TLS, IPsec, and VPNs. In embodiments, the login server 40 creates a user account in a database and points the user to a login page. Preferably, the login server 40 provides the browser with a registration form, and the user enters a username, password, and/or security question answer in step 215. (Instead of the user entering this information, it is possible that the username and password may be computer-generated). Additional information may also be obtained such as the user's first and last name, email address, etc. The password will be used for signing on to all registered applications/websites. In addition, a security question answer provided by the user serves as a back-up in case the user happens to forget their password. As soon as the password is entered into the form, it is encrypted (e.g., hashed and salted) by the browser and provided to the login server 40 (see step 220). In embodiments, the hashing procedure includes: updating the last password change datetime; hashing the password with SHA-512; preparing an HMAC key; and hashing the hashed password again with the HMAC key. Meanwhile, the login server 40 generates a one-time random number for each user. The one-time random number is encrypted with the hashed password and provided to the browser. The instructions on the browser use the password-encrypted one-time random number to further encrypt the user's credentials and other data (including associated websites or URIs) obtained e.g., during the browsing session (step 225). In step 235, the encrypted user credentials and other data are sent to the login server 40 to be stored. It is appreciated that the encrypted data may be stored by the login server 40, and/or by one or more distributed servers and/or databases in communication with the login server 40. In embodiments, the distributed servers and/or databases may be located within one or more computing clouds.

Steps 240-260 represent "post-registration" steps performed between the user computer 20 browser and the login server 40. Once a user has registered with the login server 40, he may go to the login server website (step 240) and enter his login password. (It is appreciated that if it is still the same browsing session, the password is stored in memory on the browser and the user does not need to re-enter his username and password). If it is a different browsing session, and the user is not yet logged in, once he enters his username and password the login server searches for the username. If the username is found, the hashed password is compared with the stored hashed password. (step 245). Upon validation by the login server 40, the user's encrypted credentials and data are provided to the user computer 20 (step 250). Instructions on the user's browser use the entered password to decrypt and reveal the one-time random number, which in turn, is used to decrypt the user website credentials/data (step 255). If the user desires to access a website requiring authorization, the browser seamlessly provides the user's data/credentials to the website such that the user is "automatically" logged in (step 260)—without having to type in any additional passwords.

Figure 2B:
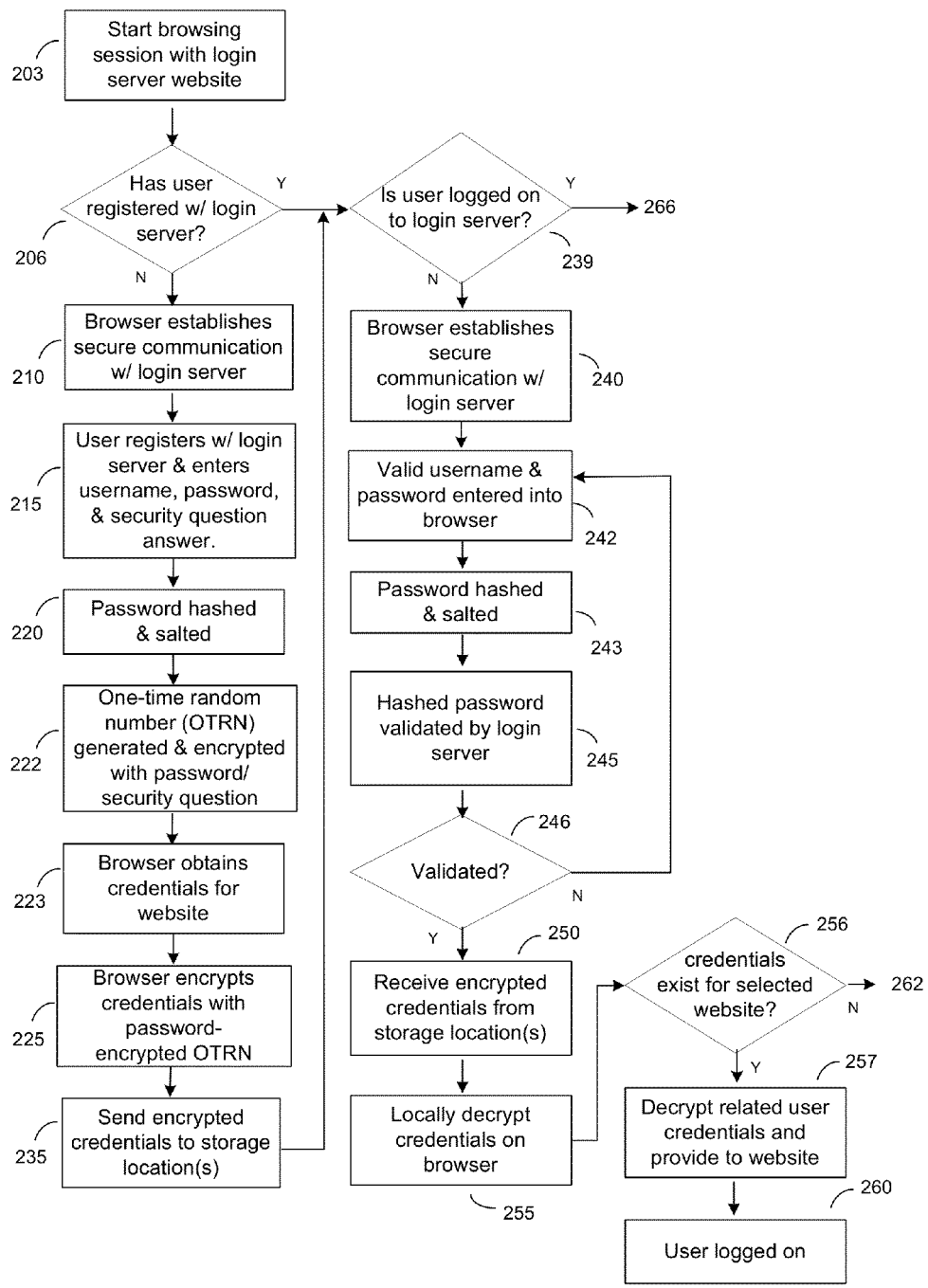
Figure 2C:
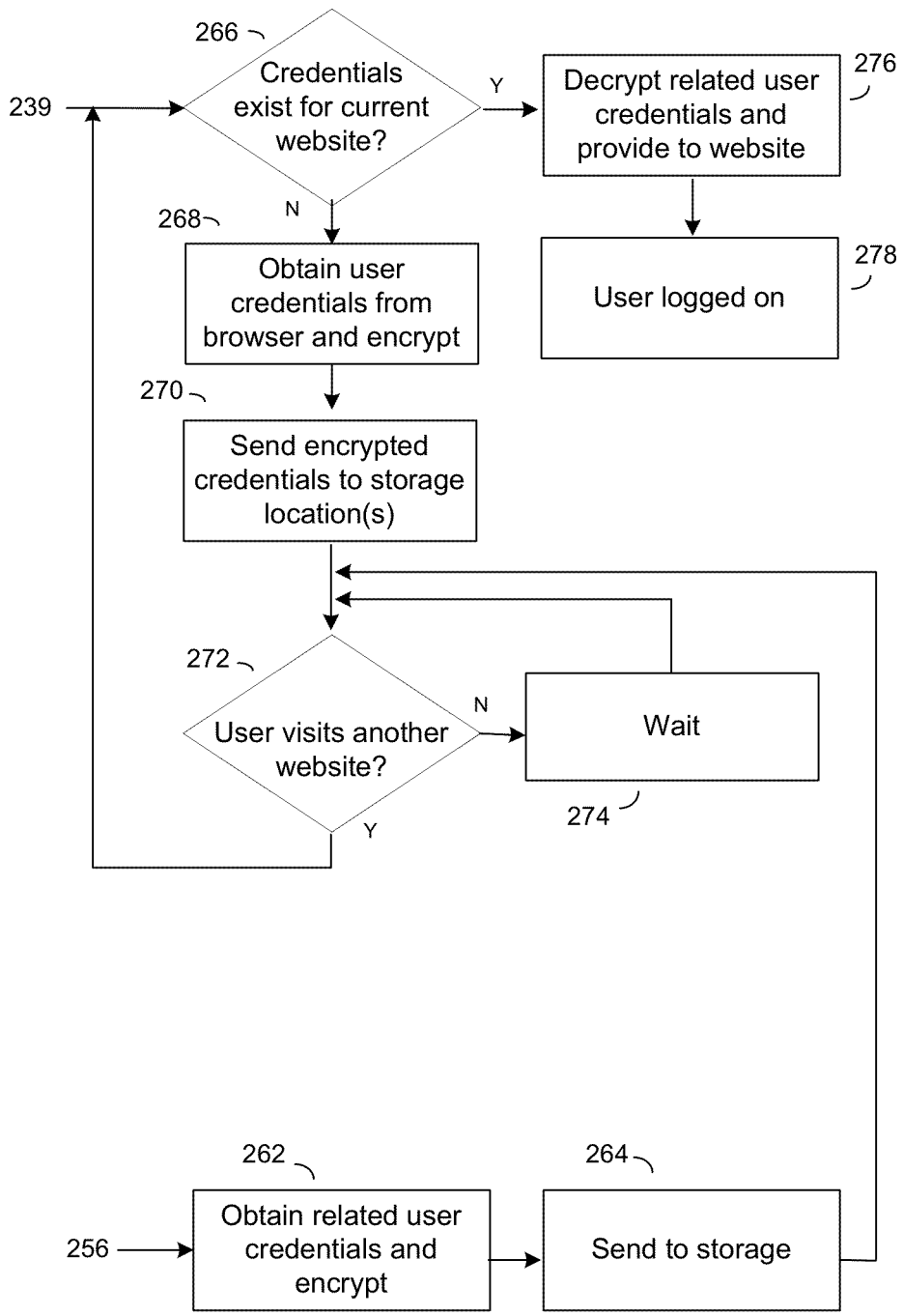

FIGS. 2b-c illustrate a more detailed implementation of the steps shown in FIG. 2a. Beginning at step 203, the user computer browser initiates a session with the login server website. A determination is first made at step 206 whether the user has previously registered with the login server. If the user has not been registered, a secure communication session (e.g., SSL/TLS) is established with the login server 40 (step 210). The user enters a username, password and optionally a security question answer into an online form (step 215). The password is immediately hashed and salted by the user browser in step 220 and submitted to the login server 40 to be stored. In embodiments, the hashing procedure includes: updating the last password change datetime; hashing the password with SHA-512; preparing an HMAC key; and hashing the hashed password again with the HMAC key. The login server 40 further generates a one-time random number for the user. In step 222, both the one-time random number and security question answer are encrypted with the hashed password (step 222). In step 223, the browser obtains user credentials (associated with certain websites/URIs) and other user information. The user (e.g., website) credentials are locally encrypted on the browser using the hashed password-encrypted one-time random number obtained from the login server 40 (step 225). In step 235, the encrypted credentials/user data are sent to one or more storage location(s). It is appreciated that the storage location(s) may comprise one or more servers and/or databases, and in embodiments, one or more cloud computing systems, or the user's local disk storage or mobile storage.

However, if the user has previously registered with the login server 40, another determination is made as to whether the user is currently logged on (step 239). If the user is not logged on, a secure communication session is established with the login server 40. See step 240. A valid username and password are obtained in step 242, and the password hashed and salted (step 243). In step 245, the browser requests validation of the hashed password from the login server 40. If the received encrypted password matches the stored encrypted password, the user is validated by the login server 40 at step 246. In addition, it is appreciated that a combination of proprietary or non-proprietary Authentication protocols may also be implemented here. If the password/user is not validated, a valid username and password are requested again (step 242). Upon validation, the login server 40 allows the user's encrypted credentials and other data to be sent to the user's browser from the one or more storage locations (step 250). In step 255, the user's browser uses the password to decrypts the one-time random number which is then used to decrypt the user's credentials and other data.

Optionally, in step 256, a determination is made as to whether the decrypted data includes the current website. If the URI information is found, then relevant user credentials are decrypted by the browser and provided to the desired website (see step 257). As a result, the user is "automatically" logged into the website (step 260). If URI information for the website is not found, the URI and any associated user credentials are obtained and encrypted by the browser for the next time (step 262). The encrypted information is subsequently sent to one or more storage locations in communication with the login server 40 (step 264). It is appreciated that the storage location(s) may comprise one or more servers and/or databases, and in embodiments, one or more cloud computing systems.

On the other hand, if it is found that the user is already logged on to the login server at step 239, another determination is made whether a URI has been stored for the current website (266). If a URI does exist, the browser decrypts any related user credentials (using the password and recovered one-time random number) and provides them to the desired website to automatically log the user in (steps 276, 278). If however, a URI does not exist for the current website, any URIs or user credentials entered into the browser are encrypted and sent to one or more storage locations for the next time (steps 268, 270). Again, it is appreciated that the storage location(s) may comprise one or more servers and/or databases, and in embodiments, one or more cloud computing systems, the user's local disk storage or mobile storage. In step 272, a determination is made as to whether the user has visited another website. If not, the browser waits until another website has been selected (step 274). If the user has selected another website, the process begins again at step 266.

Figure 3A:
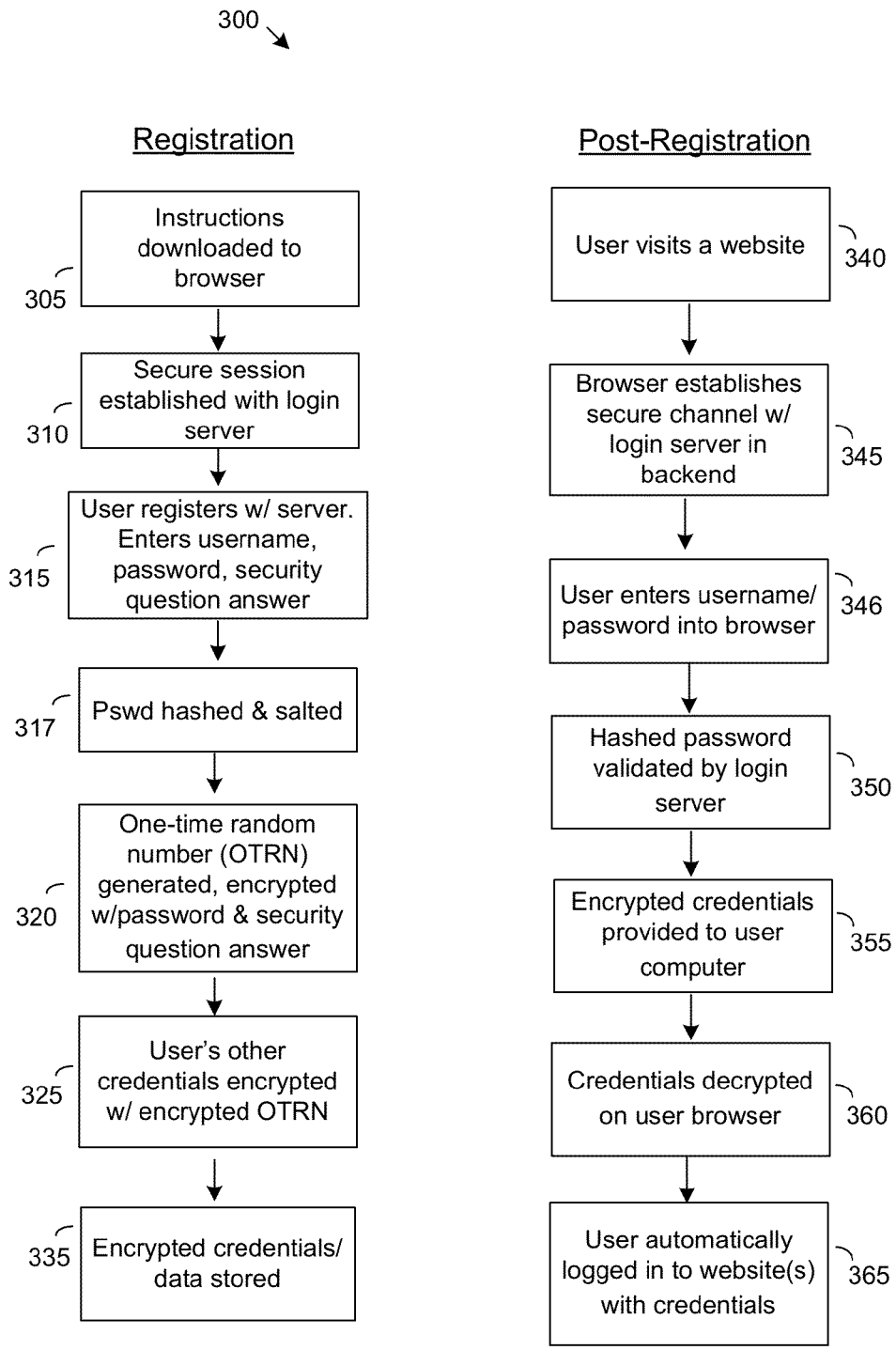
FIG. 3a illustrates another implementation where a user goes to a website and is signed on through the login server.

FIG. 3a shows a basic implementation 300 where a user is able to go to a website and be connected with the login server in the background for single sign-on. Here, initial registration steps 305-335 are similar to the implementation of FIG. 2a. In step 305, instructions are downloaded to the user computer browser. (It is appreciated that the instructions may be downloaded directly from the login server 40, or from another source). The instructions enable the user computer browser to perform the disclosed method steps and may take the form of an App, plug-in, add-on, or the like. In step 310, a secure session is established with the login server website 40 and the user enters a username, password and security question answer into a form presented on the browser (step 315). The password is immediately hashed and salted on the user browser before being submitted to the login server 40 (step 317). In step 320, the login server generates a one-time random number for the user and encrypts both it, and the security question answer, with the hashed password. The instructions on the user's browser subsequently encrypt the user's credentials and select other user data (including URIs associated with the credentials) using the hashed password-encrypted one-time random number (step 325). According to step 335, the encrypted credentials and other data are sent to the login server to be stored. It is understood that the encrypted data may be stored by the login server 40, and/or by one or more distributed servers and/or databases. In embodiments, the distributed servers and/or databases may be located within a computing cloud.

"Post-registration" steps 340-365 are different from the implementation of FIG. 2a in that once a user has registered with the login server 40, he may go directly to any registered website 50$_n$ (i.e., a website for which credentials have been obtained and stored). See step 340. The user enters his single sign-on password into his browser and a secure communication session with the login server 40 is established in the backend. See step 345. In step 350, the hashed password is validated by the login server 40. Here it is appreciated that other proprietary or non-proprietary Authentication protocols may also be used. Upon validation of the password/user, the user's encrypted credentials and other data are provided to the user computer 20 (step 355). The user's browser decrypts the user website credentials/data in step 360 using the password and recovered one-time random number. The browser provides the user's credentials/data to the website 50$_n$ such that the user is automatically logged in (step 365)—without having to type in an additional password.

Figure 3B:
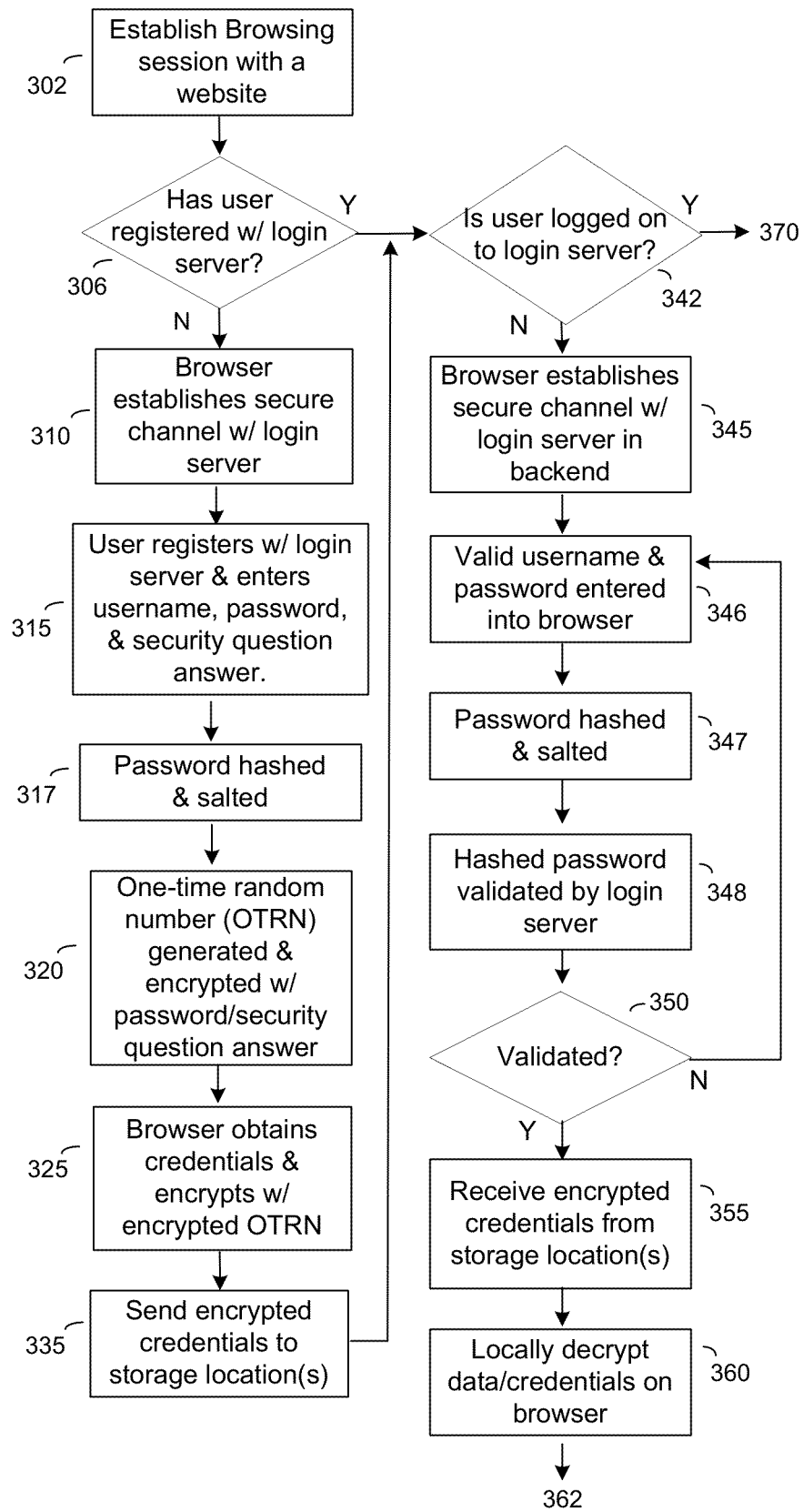
Figure 3C:
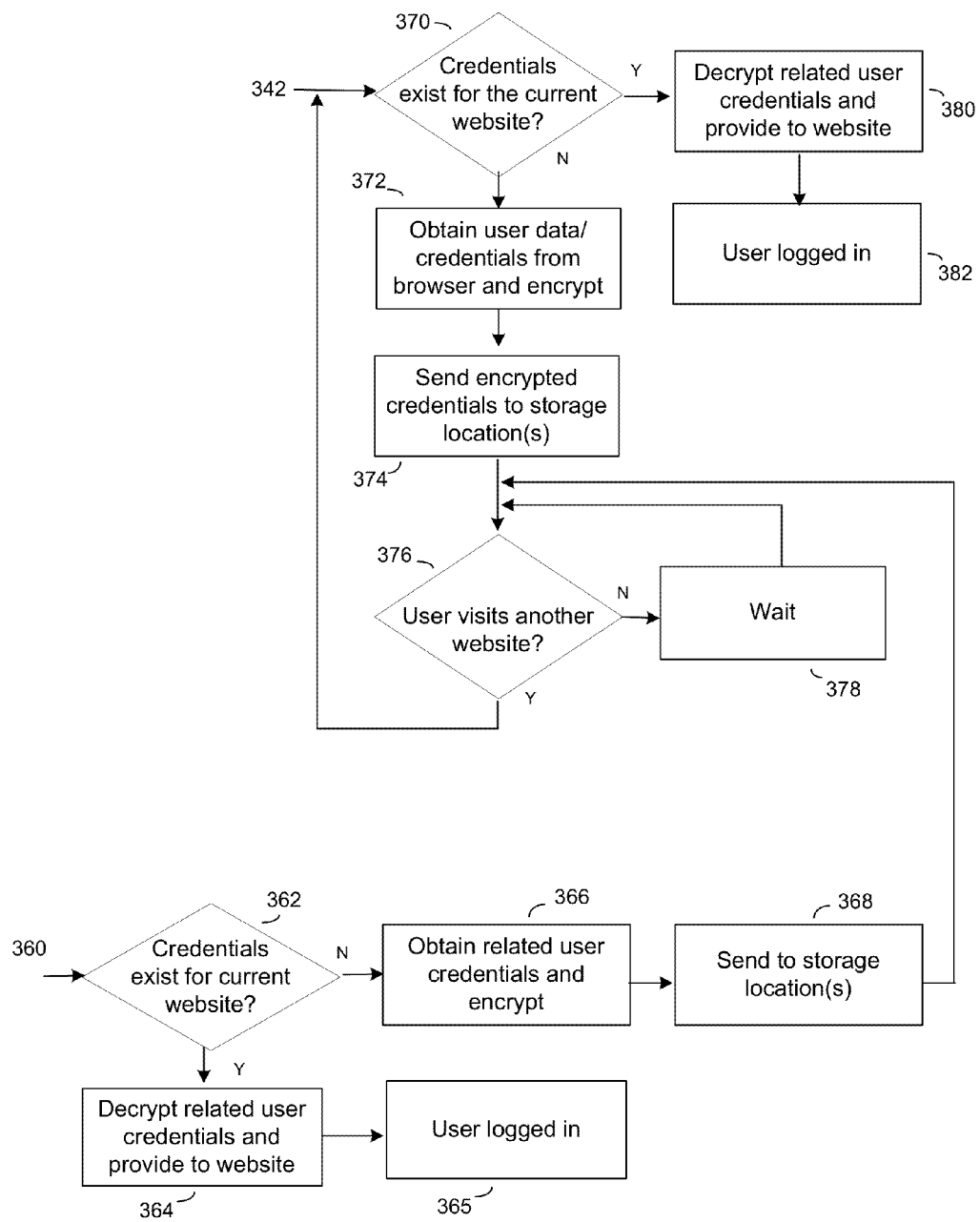

FIGS. 3b-c illustrate a more detailed implementation of the steps shown in FIG. 3a. Beginning at step 302, the user computer browser starts a browsing session with a website 50$_n$. A determination is then made at step 306 whether the user has previously registered with the login server 40. If the user has not been registered, the browser establishes a secure communication session (e.g., SSL/TLS, IPsec, etc.) with the login server 40 (step 310). The user registers with the login server 40, and establishes a username, password, and security question answer (step 315). The password is immediately hashed and salted by the browser before being submitted to the login server 40 (step 317). In step 320, the login server 40 generates a one-time random number for the user which is encrypted with the hashed password and security question answer. In step 325, the browser encrypts select the user's website credentials and other data (including URIs associated with the credentials) with the password-encrypted one-time random number. The encrypted user data and credentials are then sent to one or more storage location(s) (step 335). It is appreciated that the storage location(s) may comprise one or more servers and/or databases, and in embodiments, one or more cloud computing systems or the user's local disk storage or mobile storage.

On the other hand, if the user has previously registered with the login server 40, a determination is made whether the user is currently logged on (step 342). If the user is not logged on, the user computer browser establishes a secure communication session with the login server 40 in the backend. See step 345. In step 346, the user enters his username and password into the browser. The password is immediately hashed and salted (step 347) and validated by the login server (steps 348, 350). If the hashed password matches the stored encrypted password and/or other authentication conditions are met, the password/user is validated by the login server 40. If the user is not validated, a valid username and password are requested again (step 346). Upon validation, the login server 40 causes the user's encrypted data and credentials to be sent to the user's computer from the one or more storage locations (step 355). The user's browser decrypts the received website credentials and other data in step 360 using the password and recovered one-time random number.

In step 362, a determination is made as to whether the decrypted user data includes credentials for the current website. If the credentials are found, the browser provides them to the desired website. See step 364. As a result, the user is automatically logged into the desired website (step 365). However, if credentials for the website are not found, any user data and associated user credentials are obtained and encrypted by the browser for the next time (step 366). The encrypted data is subsequently sent to one or more storage locations (step 368) which may comprise one or more servers and/or databases, and in embodiments, one or more cloud computing systems.

If the user is already logged on to the login server, a determination is made as to whether credentials have been stored for the current website (370). If credentials do exist, the browser decrypts any related user credentials and provides them to the desired website $50_n$ to automatically log the user on (steps 380, 382). If credentials do not exist for the current website, any credentials entered into the browser are encrypted with the password-encrypted one-time random number and sent to one or more storage locations for further reference (steps 372, 374). Again, it is appreciated that the storage location(s) may comprise one or more servers and/or databases, and in embodiments, one or more cloud computing systems. In step 376, a determination is made as to whether the user has visited another website. If not, the browser waits until another website has been selected (step 378). If the user has selected another website, the process begins again at step 370.

Optical Login

According to other embodiments, optical codes may be used to register and/or log in a user. Generally speaking, the user downloads instructions (e.g., an App) on his mobile device browser and registers his mobile device 20 with the login server website. The login server 40 creates a one-time random number and/or digital certificate (e.g., X.509) for the mobile device 20. The mobile device 20 receives the digital certificate/one-time random number over a secure channel. In an even further embodiment, the digital certificate is embedded in an optical code, and the user gets the optical code using a scanner on his mobile device 20. Secure channels include, but are not limited to: SSL/TLS, Ipsec, VPN, email, or SMS. Examples of optical codes include, but are not limited to: bar codes, quick response (QR) codes, pictures, and images. After the user's mobile device 20 obtains the digital certificate, for example, it communicates with the login server 40 in the backend to be validated/authenticated before being registered. Again, it is appreciated that authentication and/or authorization of the user may happen behind the scenes using any standard or non-standard authentication protocols. The next time the user goes to login to the browser on his desktop device 20', he is presented with a login page including a QR code. The user reads the QR code e.g., with the camera of his mobile device 20 in order to validate the mobile device 20. Alternatively, if the user is on a mobile browser, detection of the optical code happens automatically. According to various implementations, the user may additionally need to enter a username (e.g., email address) and password/PIN into the browser on their desktop or mobile device, or simply do nothing. Once validated, the user is automatically logged in to registered websites on his mobile device 20, desktop 20', and/or any user device 20".

Figure 4:
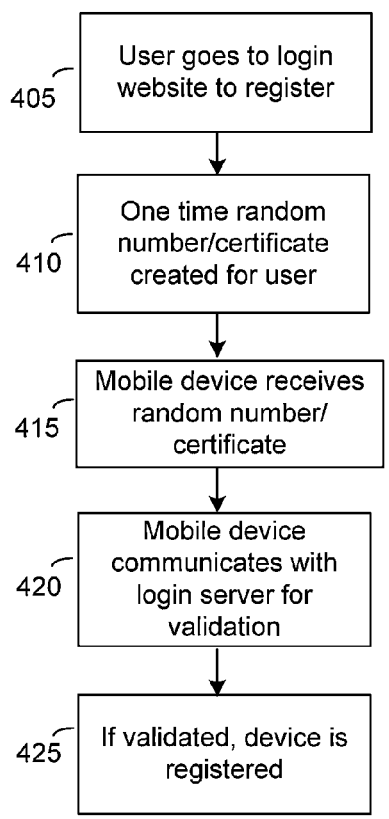
FIG. 4 illustrates yet another implementation where a user registers with a login server and receives a two-dimensional code.
Figure 4:
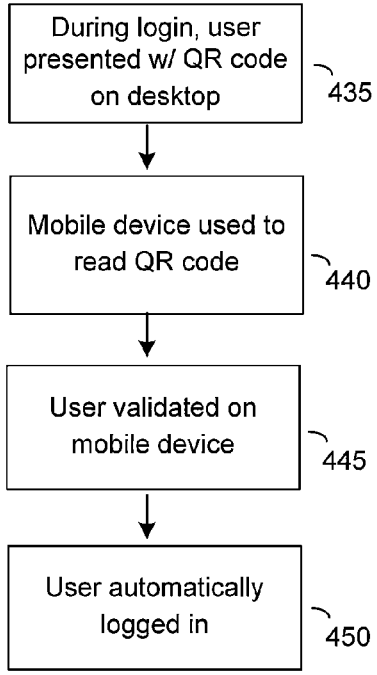

FIG. 4 shows method steps (generally depicted by element 400) for registering with a login server 40 and receiving an optical code for single sign-on, and should not be taken to be limiting, but rather exemplary in nature. Steps 405-425 are performed when user device 20 first registers with the login server 40. In step 405, the user goes to the login website to register. A one-time random number or digital certificate is generated for the user by the login server 40 (step 410). In step 415, the user device 20 receives the certificate/one-time random number over a secure channel (such as SSL/TLS, Ipsec, VPN, email, SMS, etc.). Additionally or alternatively, the digital certificate is embedded in an optical code and the user device 20 receives the optical code e.g., with the camera of his mobile device 20. Examples of optical codes include: bar codes, quick response (QR) codes, pictures, images, etc. Upon receipt of the digital certificate/one-time random number, the mobile device 20 communicates with the login server 40 in the background for validation/authentication (step 420). Upon validation, the user/mobile device 20 is registered (step 425). The next time the user wants to log in to his desktop 20', he is presented with a QR code (step 435). He uses his mobile device 20 to read the code and establish a secure session with the login server 40 (step 440). In step 445, the user/user device 20 is validated by the login server 40 using a combination of standard and/or non-standard authentication protocols. According to different authentication implementations, the user may additionally need to enter a username (e.g., email address or a pin number) and/or password into their mobile or desktop browser—or simply do nothing. Once validated, the user is automatically logged in to registered websites on his mobile device 20, desktop 20', and/or any user device 20" (step 450).

Additionally, it is appreciated that other "third-party" websites $50_{1-n}$ can partner with the login server 40 to participate in QR single sign-on. According to one implementation, the login server 40 serves to "automate" the user authentication process for these websites $50_{1-n}$. In this case, the "third-party" websites $50_{1-n}$ separately register with the login server 40 to participate in automatic user authentication. According to another implementation, the "third-party" websites $50_{1-n}$ obtain a copy of the login software/instructions such that all user/device registration takes place with the websites $50_{1-n}$ directly and the login server 40 does not know anything.

According to another implementation, the "third-party" websites 50₁₋ₙ integrate with the login server 40 via integration links.

Another application of the QR code is that of online gaming. For example, the user's mobile device 20 cameras may be pointed to QR codes such that the user's mobile device 20 will interact with the login server 40 or other user devices 20" to communicate and play games. Other uses of QR codes include creation of confidential QR codes by users for conversation, chatting, passing information/data, and more.

Illustrative Example

The user installs instructions in the form of an Application to his mobile phone 20. During registration, the user may be presented with an X.509 certificate embedded in a QR code on a desktop device 20' and installed on the mobile device 20. The user reads the QR code with his mobile phone 20 which requests validation from the login server 40. Upon validation, the user is automatically logged in and the browser on his desktop device 20' opens up.

Password Beneficiary

As a result of decentralized credential/user information management, a user may submit not only credentials, but other personal information to be securely stored on one or more servers and/or databases. The login server 40 creates an account for each user and knows where to locate all of the user's data—yet does not know what the user's personal data is—because it can only be unencrypted by the user. As mentioned, the user's personal data may include not only credentials, but financial data, legal documents, or anything the user desires to remain private and secure. In some situations, however, it may be desirable to assign one or more beneficiaries to a user's password and/or login account. For example, if a user becomes incapacitated or deceased, it may become necessary for others to access a user's personal data and/or portions of the user's login account. Beneficiaries may include relatives, attorneys, corporate management, trusted friends, etc. In addition, examples of stored data or documents managed by the user's login account include wills, stock certificates, titles, and more. There are various options for assigning one or more beneficiary according to the situation. One beneficiary may be assigned the user's password such that they alone can unlock the user's data in their account. In another implementation, two or more beneficiaries may be assigned such that each can separately unlock the user's data. In a "dual" mode, two or more beneficiaries can only unlock the user's data once all of the beneficiaries have entered their passwords. To conveniently assign beneficiaries, and determine what data each beneficiary can access, the user may use an account management dashboard (see e.g., FIG. 10) provided by the login server 40. The dashboard is a user-friendly GUI that enables the user to easily manage their credentials, documents, data, etc.

Figure 5:
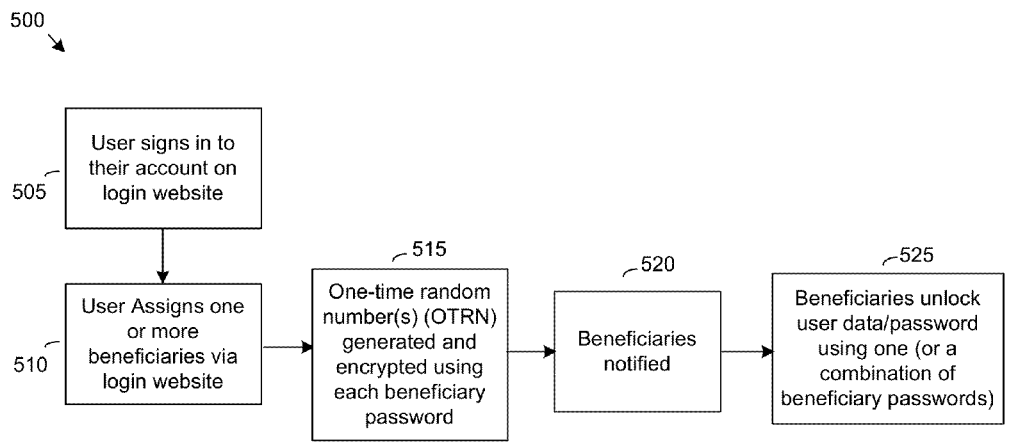
FIG. 5 illustrates another implementation where a user may assign one or more password beneficiaries (or may be known as trusted friends) through the login server.

FIG. 5 shows method steps for assigning one or more password beneficiaries through the login server 40 (as generally depicted by element 500). Assuming the user has already registered with the login server 40 and created a user account, the user signs in to the login server website (step 505). Here, the user is provided a GUI or dashboard (shown in FIG. 10) that enables him to access his account and assign one or more beneficiaries (step 510). Here, the one-time random number generated for the user is encrypted with each beneficiary password (however other variations are possible). See step 515. In step 520, the one or more beneficiaries are notified and provided with instructions for accessing the user's account. Such notification may take place via email, text, their own login account, etc. The beneficiaries may then unlock the user's password and/or designated portions of the user's account (step 525).

Website Membership Management

Another application of the present disclosure is Website Membership Management (WMM). This application facilitates secure management and access of user accounts by websites that sell information or services to customers. For example, video streaming websites can use the login server 40 to securely disseminate data to authorized users. Instead of the user having to enter a separate username and password, the website sends a link to the user's account. The user only needs to click on the link in order to be automatically logged in to the website. In this way, such websites can make the user's life easier while properly addressing licensing issues. According to another implementation, these websites can integrate with the login server 40 via optical images such as QR codes, or the like.

Figure 6:
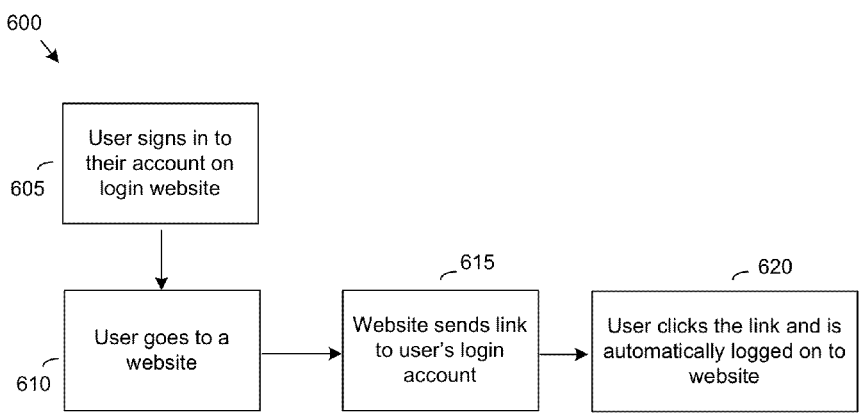
FIG. 6 illustrates yet another implementation where a website that sells data or services may securely distribute content to authorized users via the login server—where access is provided to users by the content owner.

FIG. 6 shows method steps for securely disseminating content to authorized users via the login server 40 (as generally depicted by element 600). Assuming the user has already registered with the login server 40 and created a user account, the user signs on and goes to a website (steps 605, 610). The website sends a link to the user's single login account (615). Thus, instead of having to know a username or password, the user only needs to click on the link and is automatically logged in to the website (620).

Figure 7:
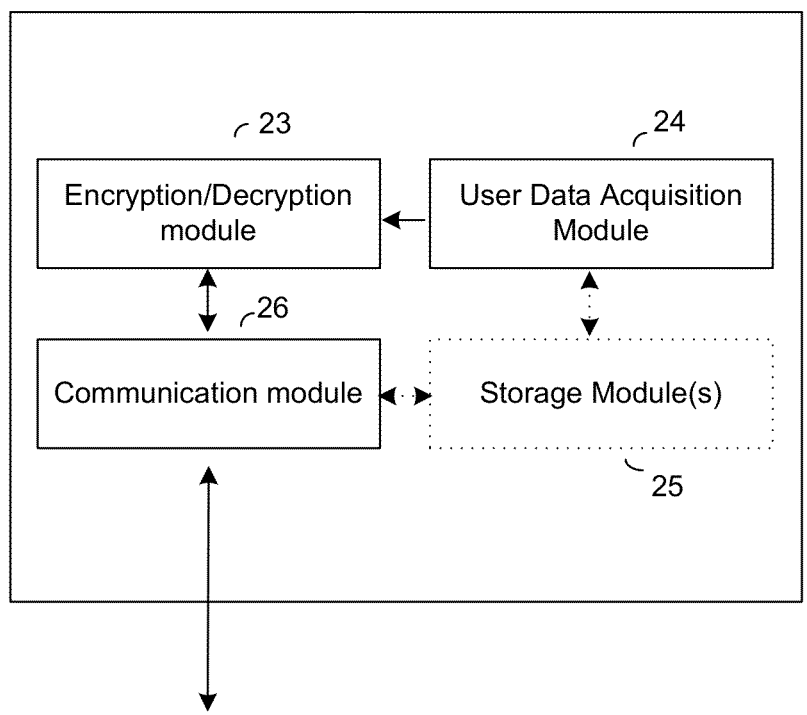
FIG. 7 illustrates an exemplary user computer according to the present disclosure.

FIG. 7 shows an exemplary user computer (20) according to the present disclosure. It is appreciated that the user computer 20 includes a variety of hardware and software. Preferably, the user computer 20 comprises: one or more processors, one or more transmitters and receivers (including antennae), a power supply (e.g., connected to a motherboard), storage media, memory/RAM, and input/output device(s). Examples of storage media include: ROM, hard drives, SD cards, micro SD cards, multimedia cards, SIM cards, compact flash, secure digital, memory sticks, CDs, DVDs, floppy disks, zip drives, tapes, mobile storage devices, and the like. Input/output devices may include: keyboards, voice input, touch screen, stylus, mouse, display, camera/scanner, mobile device, etc. User computer 20 may also include data interface (s), such as IR, USB, firewire, Bluetooth, etc. (not shown). The user computer 20 also includes a proprietary or open source Operating System including, but not limited to any Windows, UNIX/Linux, or MAC platform (e.g., iPhone 3G or later), RIM OS, PALM OS, Symbian OS, etc. In addition, the user computer 20 includes a graphical user interface and preferably web browsing capabilities such as provided by Internet Explorer, Firefox, Chrome, Safari, TV, DVR, or the like.

Figure 8:
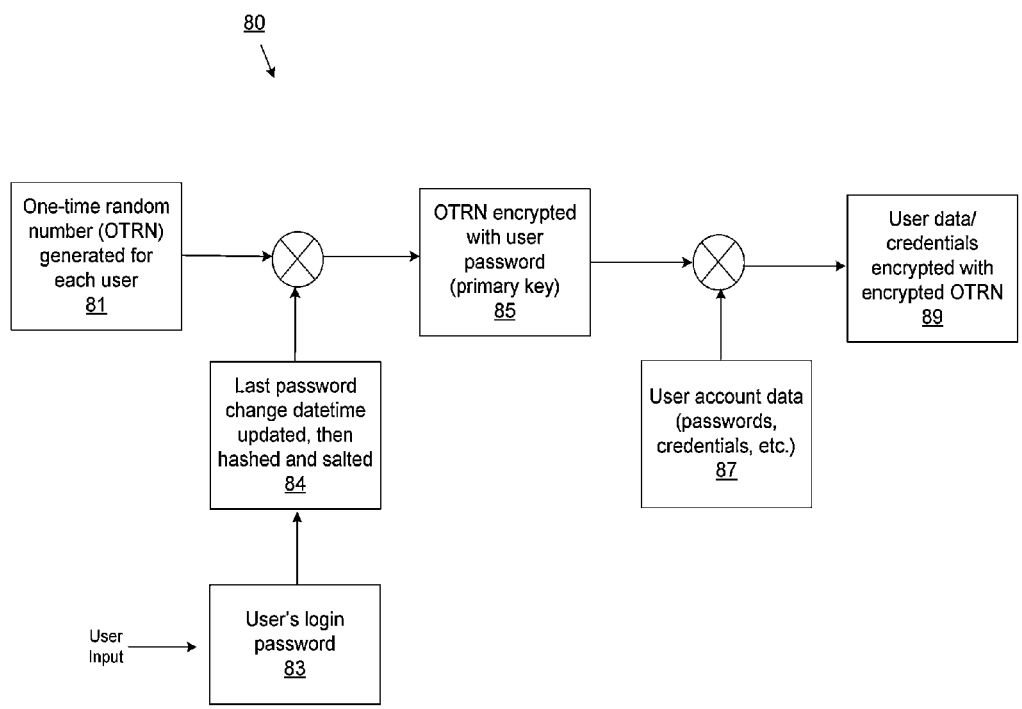
FIG. 8 illustrates an exemplary encryption algorithm according to the present disclosure.

As shown in the figure, the user computer 20 preferably includes a processor 21 comprising browser software. The processor 21 further includes inter alia an encryption/decryption module 23, a user data acquisition module 24, optional storage modules 25, and a communication module 26. The encryption/decryption module 23 further includes instructions for performing algorithm steps as shown in FIG. 8. Preferably, the encryption module 23 uses encryption standards as set forth in FIPS 140-2, 180-1, 180-2, and FIPS 197. User data acquisition module 24 obtains input from the user through I/O device(s) as well as stored URI information, user data, credentials, etc. Optional storage module(s) 25 include any removable or non-removable storage media associated with the user computer 20. Communication module 26 performs communication with other computer devices over one or more networks, such as the Internet.

It is appreciated that the disclosed modules may take the form of computer executable instructions, such as program modules, executed by one or more computer or other devices. Program modules may include programs, routines, objects, data structures, etc. for performing particular tasks. Functionality of the modules may be combined or distributed as desired in various embodiments.

FIG. 8 illustrates an exemplary encryption algorithm according to the present disclosure (generally depicted by element 60). As shown in step 61, a one-time random number is generated for each user. Preferably the one-time random number is generated using a FIPS 140-2-approved random number generator. The one-time random number is then locally encrypted with the user's password 63 (entered into the browser and known only to the user). See step 65. In embodiments, the user's password is hashed and salted before being sent to the login server 40. However, it is appreciated that other one-way functions for encrypting the password are possible as long as data integrity is ensured. In step 67, other user data including documents, URIs and associated passwords/credentials, etc. are obtained by the browser and encrypted with the one-time random number (step 69). In other words, all user website details are further encrypted using the password-encrypted one-time random number.

In operation, a user enters his password on his browser, the browser hashes and salts the password before being sent to the login server 40. Server 40, in turn, generates a one-time random number and encrypts it with the hashed password/security question answer. During the browsing session, user device 20 browser obtains other user data/credentials and encrypts this information with the password-encrypted one-time random number. The resulting encrypted information is sent to the login server 40 for storage. When a user wants to login at a later time, he enters his password into the browser which is used to recover the one-time random number. The browser then uses the random number to decrypt the user's credentials and other data. In the event that the user happens to forget his password, the login server may present him with a pre-established question as a backup. If the user correctly answers the question, he is able to use this to decrypt the random number.

Figure 9:
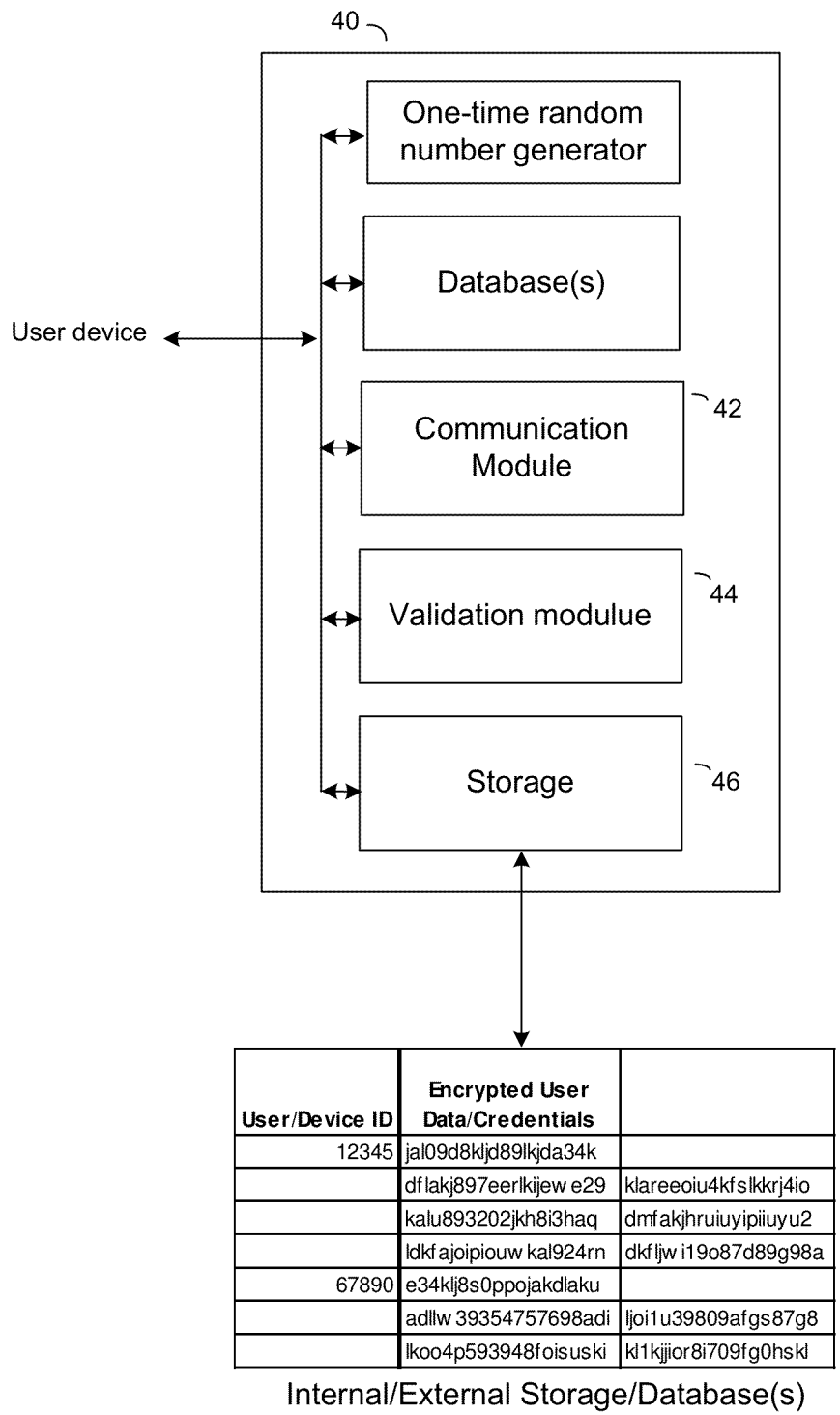
FIG. 9 illustrates an exemplary login server according to the present disclosure.

FIG. 9 illustrates an exemplary login server 40 according to the present disclosure. As shown in the figure, server 40, may comprise inter alia: a one-time random number generator 41, communication module 42, validation module 44, storage module(s) 46, and database(s) 47. Preferably, the one-time random number generator module 41 comprises one or more FIPS 140-2-approved random number generators. It is appreciated that communication module 42 performs communication with other devices over one or more networks, such as the Internet. Validation module 44 compares received encrypted user credentials with stored encrypted credentials and/or other user information in order to validate the user and may use a combination of standard/non-standard authentication protocols. Storage module 46 comprises internal and/or external storage and may include access to one or more distributed servers and/or databases. In embodiments, the login server 40 comprises one or more database(s) 47. Exemplary database fields may include username/email address and associated encrypted user data and/or credentials.

It is understood that the method steps and modules of the present disclosure may be performed using any combination of hardware and/or software as will be appreciated by those skilled in the art. Preferably, instructions residing on computer readable media configure the user computer and/or central computer to execute the method steps. Such instructions may be in the form of an API, plug-in, add-on, download, or the like and may also contain additional hardware and/or software instructions for performing the disclosed method steps and/or storing music/video content. Software instructions may further include custom macros, sub-routines, logic, or the like implemented using commercially available software such as MS SQL Server™, Visual Basic, C, C++, SMIL, XML, HTML, XHTML, Java, JavaScript, C#, APIs, etc.

According to a further embodiment, the software instructions for performing the disclosed method steps reside in whole, or in part, on a computer-readable medium. In embodiments, the computer readable medium corresponds to portions of storage media on user computer 20. Examples of computer readable media include, but are not limited to: hard drives, memory chips (e.g., RAM/ROM), memory sticks (e.g., USB), memory cards (e.g., SD, SIM, etc.), CDs, DVDs, tapes, or the like. In addition, the computer readable media may be integral with, or removable from, user computer 20.

Password Dashboard

To facilitate management of a user's account, the login server may provide a user-friendly graphical user interface (GUI), or dashboard. The dashboard may display icons of websites for which URI information and associated user credentials are stored for the user. In this way, the user can quickly and easily scroll through multiple icons of websites they have registered for. By simply clicking on an icon (selecting a URI), the user is automatically granted access to the website.

Administrative features of the dashboard include profiles, charts, and logs for the user. For example, the log view may allow the user to easily find a website he viewed two days ago, etc. The dashboard may provide other useful features such as groups, calendar, "remember-me", "logon-all", "log-off all" and more. Here, the user may also designate beneficiaries, or grant others access, to selected portions of his account. In a business setting, an Administrator may designate what websites/accounts a user is authorized to access, monitor charts, logs, etc.

Figure 10:
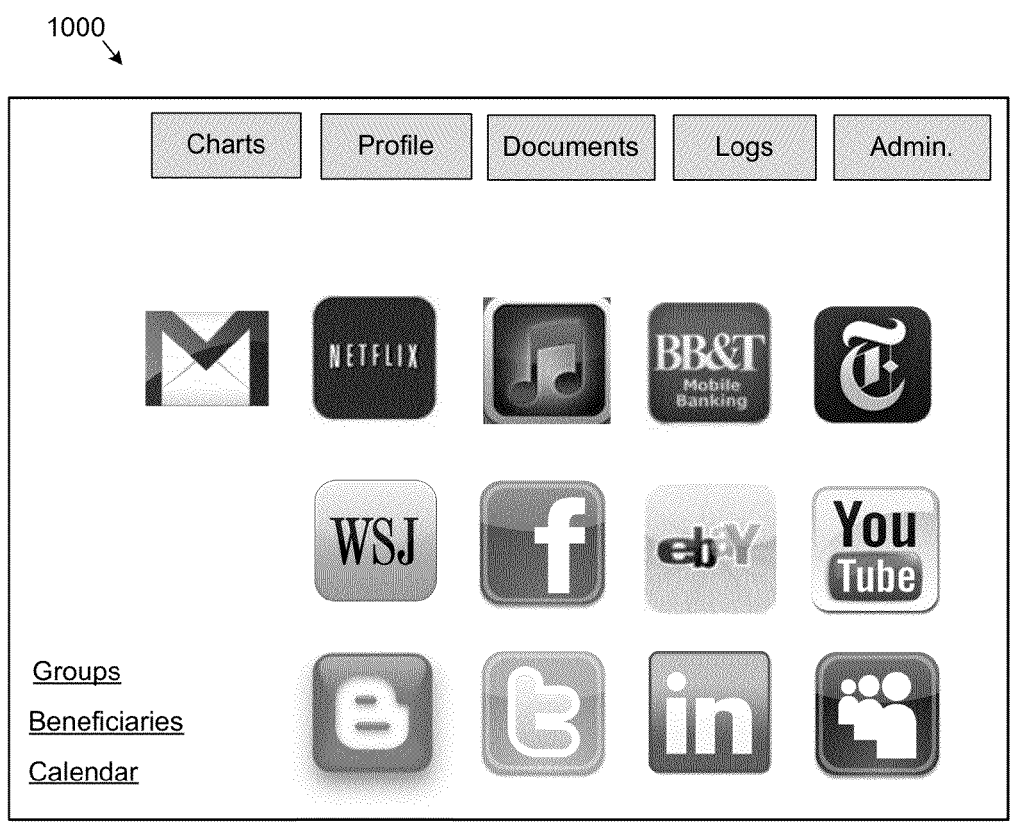
FIG. 10 illustrates an exemplary browser display according to the present disclosure.

FIG. 10 shows an exemplary browser display 1000 for a user account according to the present disclosure. Once a user logs into their account via the login server 40, they may be provided with a dashboard for managing their credentials, data, etc. Advantageously, the user need only log in once to their account to have automatic access to other websites. For example, once the user logs in via the login server, he may automatically access his other financial, social networking, and entertainment accounts. As further shown in the figure, the dashboard may also include several value-added features such as user profile, documents, logs, administrative controls, and charts. Other useful features include groups, beneficiaries, calendar, and more.

As set forth above, the present disclosure avoids several pitfalls associated with centralized password/credential management. Decentralized credential management is enabled by a multi-layered security approach that employs best practices used by large organizations and end-to-end security. It is further appreciated that once the user enters his single password and is validated/logged in, the processes disclosed herein appear "seamless" to the user and only take a number of seconds. By providing decentralized credential management as disclosed, users are provided with more control and flexibility over their personal information in a highly secure manner. The user now has the ability to manage their own credentials and data and to control who may access specified portion(s). In addition, problems associated with centralized password storage, hacking, and phishing are avoided.

The foregoing discussion of the preferred embodiments has been presented for purposes of illustration and description. It is not intended to be exhaustive or to limit the disclosure to the above examples. Many variations and modifications of the embodiments described herein will be apparent to one of ordinary skill in the art in light of the present disclosure. For example, instead of the user creating their own password, a user may receive a randomly generated password, one-time password (OTP), etc. Accordingly, the scope of the disclosure is to be defined only by the claims appended hereto, and by their equivalents.

The invention claimed is:

1. A method for decentralized single sign-on to a plurality of websites via instructions executed by a user computer browser, the method comprising the steps of:
Establishing a browsing session with a website;
Determining if the user has previously registered with a login server;
If the user has not already registered with the login server:
Causing the browser to establish a secure communication channel with the login server;
Receiving a username and password from the user;
Encrypting the password and providing it to the login server upon registration to be stored for future validation;
Receiving a password-encrypted one-time random number from the login server;
Obtaining user credentials and other user information entered into the browser;
Locally encrypting the user credentials and other user information on the browser with the password-encrypted one-time random number; and
Sending the encrypted user credential(s) and other information to the login server to be stored by one or more storage locations;
if the user has already registered with the login server:
Determining whether the user is currently logged in to the login server;
If the user is not logged in to the login server:
Causing the browser to establish a secure communication channel with the login server;
Acquiring the password from the user;
Locally encrypting the password on the browser upon login;
Requesting validation of the user's encrypted password from the login server;
If validated, receiving stored encrypted user credentials and/or other user information from the one or more storage locations;
Decrypting the stored credentials and/or other user information with the password to reveal the one-time random number;
Using the one-time random number to decrypt the user credentials and/or other user information;
Determining whether user information exists for the current website; and
If user information for the current website exists, further decrypting any user credentials related to the website and providing the credentials to the website to automatically log the user into the website;
if the user is logged in to the login server:
Determining whether user information exists for the current website; and
If user information exists, further decrypting any user credentials related to the website and providing the credentials to the website to automatically log the user into the website;
Wherein all encryption and decryption of the user's password and credentials are performed locally by the browser on the user computer.

2. The method of claim 1, where the user is validated at least if the encrypted password upon login matches the encrypted password upon registration.

3. The method of claim 1, where the password is encrypted by hashing and salting the password.

4. The method of claim 1, where the user computer browser is further provided with a digital certificate and the user is validated by the login server upon validation of the digital certificate.

5. The method of claim 1, where the user computer browser is further provided with an optical code and the user is validated by the login server upon validation of the optical code.

6. The method of claim 1, where the user's encrypted credentials are stored on one or more virtual servers and/or a cloud computing platform.

7. The method of claim 1, where the user's encrypted credentials are stored on at least one of the user computer and a removable memory device.

8. The method of claim 1, where one or more beneficiaries are assigned to the user's password and the one or more beneficiaries are able to access select portions of the user's credentials and/or other information using at least one, or a combination of, one or more beneficiary passwords.

9. The method of claim 1, where the encrypted other user information includes uniform resource indicator(s) associated with the user credential(s).

10. A method for decentralized single sign-on to a plurality of websites via instructions executed by a user computer browser, the method comprising the steps of:
Establishing a browsing session with a login server website;
Determining if the user has previously registered with the login server;
If the user has not already registered:
Establishing a secure communication channel with the login server website;
Receiving a password from the user and locally encrypting the password on the browser;
Sending the encrypted password to the login server for future validation;
Receiving a one-time random number from the login server encrypted with the encrypted password;
Obtaining user credentials and other user information entered into the browser;
Locally encrypting the user credentials and other user information on the browser with the encrypted one-time random number;
Sending the encrypted user credentials and other user information to one or more storage locations;
if the user has already registered with the login server:
Determining whether the user is already logged in to the login server;
If the user is not logged in:
Establishing a secure communication channel with the login server;
Acquiring the password from the user;
Locally encrypting the password on the browser;
Requesting validation of the user's encrypted password from the login server;

If validated, obtaining any encrypted user credentials and other user information from the login server;

Locally decrypting the obtained user credentials and other user information on the browser;

Obtaining a website selection from the user;

Determining whether user credentials exist for the selected website; and

If user credentials for the selected website exist, providing the credentials to the website to automatically log the user into the website;

if the user is logged in:

Obtaining a website selection from the user;

Determining whether user credentials exist for the selected website; and

If credentials for the selected website exist, providing the information to the website to automatically log the user into the website;

Wherein all encryption and decryption of the user's credentials are performed locally by the browser on the user computer.

11. The method of claim 10, where the user is validated at least if the encrypted password upon login matches the encrypted password upon registration.

12. The method of claim 10, where the password is encrypted by hashing and salting the password.

13. The method of claim 10, where the user computer browser is further provided with a digital certificate and the user is validated by the login server upon validation of the digital certificate.

14. The method of claim 10, where the user computer browser is further provided with an optical code and the user is validated by the login server upon validation of the optical code.

15. The method of claim 10, where the user's encrypted credentials are stored on one or more virtual servers.

16. The method of claim 10, where the user's encrypted credentials are stored on a cloud computing platform.

17. The method of claim 10, where the user's encrypted credentials are stored on at least one of the user computer and a removable memory device.

18. The method of claim 10, where one or more beneficiaries are assigned to the user's password and the one or more beneficiaries are able to access select portions of the user's credentials and/or other information using at least one, or a combination of, one or more beneficiary passwords.

19. The method of claim 10, where the encrypted other user information includes uniform resource indicator(s) associated with the user credential(s).

* * * * *